United States Patent
Bass et al.

(10) Patent No.: US 7,560,142 B1
(45) Date of Patent: Jul. 14, 2009

(54) FIBERS WITH BOUND METAL OXIDES AND METHOD THEREOF

(75) Inventors: Walter Bass, Bernardsville, NJ (US); Angelo Pantaleo, Newark, DE (US); John Schroeder, Mt Laurel, NJ (US); Samuel Vetrano, Bloomfield, NJ (US)

(73) Assignee: Graver Technologies LLC, Glasgow, DE (US)

( * ) Notice: Subject to any disclaimer, the term of this patent is extended or adjusted under 35 U.S.C. 154(b) by 464 days.

(21) Appl. No.: 11/530,078

(22) Filed: Sep. 8, 2006

Related U.S. Application Data

(60) Provisional application No. 60/715,050, filed on Sep. 8, 2005.

(51) Int. Cl.
*B05D 1/00* (2006.01)
*B05D 3/00* (2006.01)
*B32B 15/00* (2006.01)
*B01D 39/14* (2006.01)
*B01D 39/16* (2006.01)

(52) U.S. Cl. ............... 427/430.1; 210/503; 210/504; 210/505; 210/506; 210/508; 428/357; 428/361; 428/364; 428/403; 428/407; 427/180; 427/189; 427/190; 427/212; 427/221; 427/244

(58) Field of Classification Search ............... 210/503, 210/504, 505, 506, 508; 428/357, 361, 364, 428/403, 407; 427/180, 189, 190, 212, 221, 427/244, 430.1
See application file for complete search history.

(56) References Cited

U.S. PATENT DOCUMENTS

| | | |
|---|---|---|
| 4,190,532 A | 2/1980 | Halbfoster |
| 4,238,334 A | 12/1980 | Halbfoster |
| 4,935,265 A | 6/1990 | Pike |
| 5,249,948 A | 10/1993 | Koslow |
| 5,346,624 A | 9/1994 | Libutti et al. |
| 5,928,588 A | 7/1999 | Chen et al. |
| 5,997,829 A | 12/1999 | Sekine et al. |
| 6,265,064 B1 | 7/2001 | Mori |

*Primary Examiner*—John Kim
(74) *Attorney, Agent, or Firm*—DLA Piper LLP (US); R. Blake Johnston

(57) ABSTRACT

A fiber containing a bound active material, such as a metal oxide, under 20 microns in diameter. The inventive fiber is formed through the mixing of the fibers with a cationic or anionic polymer in one tank, the active material with a cationic or anionic polymer in a second tank, the opposite zeta potential of that used with the active material, and then mixing the active material/polymer and fiber/polymer blends together.

6 Claims, No Drawings

FIBERS WITH BOUND METAL OXIDES AND METHOD THEREOF

RELATED APPLICATIONS

This application claims priority to U.S. Provisional Patent Ser. No. 60/715,050, filed Sep. 8, 2005.

BACKGROUND OF THE INVENTION

1. Field of Invention

This invention finds use in the field of liquid purification, such as water treatment. More particularly, this invention relates to fibers coated with metal oxides for use in water purification.

2. Background

Metal oxides and hydroxides in general, and specifically the oxides and hydroxides of aluminum, iron, titanium, zirconium, manganese, copper, zinc, vanadium, nickel, platinum and palladium are effective adsorbents for the removal of heavy metals and other contaminants from liquid streams. These oxides have a very high adsorbent capacity for the removal of the metals, but the rate of removal of the metals is often limited by the physical size of the particles of the oxides and hydroxides required for good flow characteristics.

The problem of flow restrictions when using very small particles is well known. In porous structures such as carbon blocks, it is desirable to use small particles of metal oxides or hydroxides, zeolites or other materials for the purpose of removal of metals and other contaminants from liquid streams. However, if the particles are smaller than about 20 microns, they are easily eluted from the porous structure and into the treated liquid stream. One solution is the binding of small particles to fibers, as has been shown in U.S. Pat. Nos. 4,190,532 (limited to ion exchange resins with fibers having a negative charge, prior to application), 4,238,334 (limited to materials of certain charges) and 5,346,624 (limited to materials as a precoat). U.S. Pat. No. 6,265,064 plates titanium dioxide on a natural organic fiber, but such process suffers from several inherent problems. U.S. Pat. No. 4,935,265 uses coatings of metal carboxylates and metal alkoxides to strengthen fibers. Cuno U.S. Pat. No. 5,928,588 uses fibers in the production of carbon blocks to improve green strength of the blocks, but there is no mention of the use of fibers coated with materials for use in purification and other desired properties.

DETAILED DESCRIPTION OF THE PREFERRED EMBODIMENTS

It will be noted that while a majority of the following disclosure references metal oxides, other active materials ("actives") may be used, with examples disclosed herein.

Fine particles of metal oxides or hydroxides, typically smaller than 100 micron and preferably smaller than 20 microns and most preferably smaller than 1 micron in size are bound to fibers which are larger than 1 micron in diameter and greater than 20 microns in length. In one embodiment, the fiber is treated with a cationic polymer, and the metal oxide or hydroxide with an anionic polymer. Other combinations of treating with such polymers will also provide the desired effect, including treating only either the fiber or metal oxide or hydroxide. The two are mixed and the resulting material is a fiber with the metal oxide or hydroxide strongly bonded to the fiber. The fibers can be any materials, but preferably might include cellulose, rayon, polyester, polyolefins, fiberglass and others.

The general method of creating the inventive fibers is to mix the metal oxide of interest with a cationic or anionic polymer in first tank and mix the fibers with an cationic or anionic polymer, having the opposite polarity (zeta potential) of the polymer in the first tank, in a second tank, adjusting the pH of each tank if required, and them mixing the contents of the first and second tank together. Put another way, one mixes two solutions (one with the active material the other with the fibers) having opposite zeta potentials. Therefore, other combinations are if the active material has a negative zeta potential (anionic) on its own, then no polymer is added to the active but a cationic polymer is still added to the fiber solution or if the active material has a positive zeta potential, adding both a negative and positive polymer to the active material solution and coating the fibers with a anionic polymer, etc. Water is withdrawn and the coated fibers dried.

As an example, 264 pounds of fibers (Creafill R0087) were mixed for an hour in a tank with 4 pounds of a cationic polyelectrolyte (Betz 1175). In a separate tank, 240 pounds of HydroGlobe MetSorb (titanium dioxide) (Graver Technologies) was mixed for an hour with 2.5 pounds of an anionic polyelectrolyte (Superfloc A-130). The mix of fiber and cationic polyelectrolyte was added to a third tank, and then the mix of MetSorb and anionic polyelectrolye was added to the third tank, and mixed for an hour. The material was filtered on a belt vacuum filter, and then reslurried and dried in a spray dryer.

The material was determined to be approximately 8% active titanium dioxide. 0.2 grams of the material was taken, and mixed with 100 ml. of a solution containing 759 ppb of Lead at a neutral pH for 5 hours. The mass was settled, and then filtered through a 0.2 micron filter. The resultant lead content was 42 ppb. Typically, it would take about this amount of pure titanium dioxide in a granular form to achieve the same removal efficiency of lead. Hence, the material in this fiber form is about 10-12 times more efficient in removing the lead from solution.

The smaller oxide or hydroxide particles (under 20 micron) bonded to the fiber allow much faster adsorption of contaminants from liquid solutions than the particles typically used for such applications. For example, in typical fixed or fluid bed adsorption columns, particle sizes range from 200-1200 microns. Hence, the rate of adsorption, which varies with square of the diameter of the particle, is 100-3600 times faster with the present invention.

In a related embodiment, the subject inventive fibers can be coated with other active substances, such zeolites, hydroxides and ion exchange resins.

The fiber material of this invention can be used as the particles in a typical fixed or fluid bed, without the problem of significant flow restriction which would occur if using particles of the size of the metal oxides and hydroxides bound to the fiber. Additionally, it could be used as a precoat layer to another filter media. In another application, the fiber can be added to the formulations used to produce porous structures, such as blocks, sheets, and the like from materials such as carbon, plastics, and other materials. In this type of application, the benefits of the small particles are realized, while typical flow problems are eliminated. Amounts of fibers from 1% to 50%, and preferably 3% to 20%, can be added to the porous structure with none of the typical flow problems, As a consequence of the very small particle size of the oxides and hydroxides, typically less than half of the weight of the oxides or hydroxides is needed for removal of metals and other contaminants from liquid solutions, when compared to using particles of at least a 20 micron size. Contaminants that can removed by use of the fiber material of this invention include arsenic, lead, mercury, antimony, cobalt, uranium, vanadium, phosphates, silicates, nitrates, perchlorates and others.

One possible use outlined above, although not the only, is embedding the coated fibers in carbon block for filtration. Set forth below are empirical results for one test of the inventive fiber in carbon block. The data summarizes work done under test conditions of NSF 53 (standards body is NSF) and pH 8.5 for lead removal (gallons of a solution designated by NSF containing 150 ppb of lead, are run through the carbon block). The effluent concentration is listed next to the volume.

| 5% HMRF | | 12.5% HMRF | |
|---|---|---|---|
| Volume (gal) | Conc (ppb) | Volume (gal) | Conc (ppb) |
| 6 | ND | 6 | ND |
| 206 | ND | 209 | ND |
| 406 | ND | 405 | ND |
| 607 | ND | 600 | ND |
| 807 | 11 | 796 | ND |
| 1001 | 43 | 985 | ND |
| | | 1181 | ND |

The percentages are the amount of the inventive fiber product (stated here as "HMRF") in the block by weight. Note that in this case the fiber contains 20% of the active ingredient $TiO_2$. The key is that comparable amounts of competitive lead adsorbents such as Engelhard ATS yield similar results even though our material is only 20% active The oxides and hydroxides of this invention are distinctly different than the particles of this prior art. This invention solves this problem by allowing the use of particles smaller than 20 micron, and even smaller than one micron, because of the strong bonding of these small particles to the fiber. Typical prior art of the use of the larger particles can be found in U.S. Pat. Nos. 5,997,829 and 5,249,948. This invention provides a means of substantially improving the rate of adsorption, while still allowing good flow in a variety of types of applications for the oxides and hydroxides. Essentially, the invention provides a means of binding very small particles of the oxides, hydroxides, zeolites, and ion exchange resins to fibers which are of sufficient size to allow good flow characteristics, and then the use of the resultant material for extremely fast removal of heavy metals and other contaminants from water, air, and other fluids.

In addition to the structures, sequences, and uses immediately described above, it will be apparent to those skilled in the art that other modifications and variations can be made the method of the instant invention without diverging from the scope, spirit, or teaching of the invention. Therefore, it is the intention of the inventors that the description of instant invention should be considered illustrative and the invention is to be limited only as specified in the claims and equivalents thereto.

We claim:

1. A method for producing a fiber having a bound active material, the method comprising:
   a) mixing an active material with an anionic or cationic polymer in a first tank;
   b) mixing in a second tank fibers with an anionic polymer if the polymer in the first tank is a cationic polymer or a cationic polymer if the polymer in the first tank is an anionic polymer;
   c) mixing the active material and polymer of the first tank with the fibers and polymer of the second tank.

2. The method of claim 1 wherein the active material is a metal oxide is selected from the group consisting of, titanium oxide, iron oxide, copper oxide, silver oxide, zinc oxide, manganese oxide, platinum oxide, nickel oxide and zirconium oxide.

3. The method of claim 1 wherein the active material is selected from the group consisting of zeolites, hydroxides and ion exchange resins.

4. The method of claim 1 wherein the fibers are selected from the group consisting of, rayon fibers, cellulose fibers, nylon fibers, polyester fibers, polyolefin fibers, and fiberglass fibers.

5. The method of claim 1 further comprising the steps of adding water to the first and second tanks, mixing the contents of the first and second tanks in a third tank and drying the product contained in the third tank.

6. The method of claim 1 wherein the anionic and cationic polymers are polyelectrolytes.

* * * * *